US009826292B2

(12) United States Patent
Coleman et al.

(10) Patent No.: US 9,826,292 B2
(45) Date of Patent: Nov. 21, 2017

(54) MULTI-FUNCTION BEACON FOR OPTICAL COMMUNICATIONS LASER RELAY

(71) Applicant: RAYTHEON COMPANY, Waltham, MA (US)

(72) Inventors: Gary D. Coleman, Redondo Beach, CA (US); John F. Silny, Playa Vista, CA (US)

(73) Assignee: RAYTHEON COMPANY, Waltham, MA (US)

( * ) Notice: Subject to any disclaimer, the term of this patent is extended or adjusted under 35 U.S.C. 154(b) by 365 days.

(21) Appl. No.: 14/221,783

(22) Filed: Mar. 21, 2014

(65) Prior Publication Data

US 2016/0165325 A1  Jun. 9, 2016

(51) Int. Cl.
*H04B 10/00* (2013.01)
*H04Q 11/00* (2006.01)
*H04B 10/118* (2013.01)
*H04B 10/11* (2013.01)
*H04B 10/29* (2013.01)
*H04B 10/50* (2013.01)

(52) U.S. Cl.
CPC ......... *H04Q 11/0062* (2013.01); *H04B 10/11* (2013.01); *H04B 10/118* (2013.01); *H04B 10/29* (2013.01); *H04B 10/503* (2013.01); *H04Q 2011/0088* (2013.01)

(58) Field of Classification Search
None
See application file for complete search history.

(56) References Cited

U.S. PATENT DOCUMENTS

| 5,475,520 A * | 12/1995 | Wissinger | H04B 10/118 342/354 |
| 6,091,728 A * | 7/2000 | Lazraq | H04L 12/5601 370/360 |

(Continued)

OTHER PUBLICATIONS

Written Opinion of the International Searching Authority for International Application No. PCT/US2015/020621, filed Mar. 14, 2015, Written Opinion of the International Searching Authority dated Jun. 19, 2015 (5 pgs.).

(Continued)

*Primary Examiner* — Ken N Vanderpuye
*Assistant Examiner* — David Lambert
(74) *Attorney, Agent, or Firm* — Lewis Roca Rothgerber Christie LLP

(57) ABSTRACT

A laser relay module in a free space optical communication network includes: a beacon source for generating an optical beacon signal for aligning a communication channel of a source optical node to a communication channel of a receiving optical node; a beacon inserter for encoding the optical beacon signal with switching information; a telescope for transmitting the encoded optical beacon signal to the receiving optical node; a beacon detector for detecting received switching information from the modulated optical beacon signal, wherein the receiving optical node uses the encoded optical beacon signal to align communication channel of the receiving optical node with communication channel of the source optical node; and a processor for using the detected switching information to change configuration of an optical switch matrix to direct received data to a next optical node in the free space optical communication network.

16 Claims, 5 Drawing Sheets

(56) References Cited

U.S. PATENT DOCUMENTS

| | | | |
|---|---|---|---|
| 7,609,972 B2 | 10/2009 | Cunningham et al. | |
| 8,116,632 B2 | 2/2012 | Miniscalco et al. | |
| 8,315,525 B2 | 11/2012 | Cunningham | |
| 2003/0058504 A1* | 3/2003 | Cho .................... | H04L 7/0075 398/147 |
| 2003/0224735 A1* | 12/2003 | Moursund ............. | H04B 10/43 455/73 |
| 2004/0179847 A1* | 9/2004 | Johnson ............... | H04B 10/118 398/122 |
| 2009/0214216 A1* | 8/2009 | Miniscalco .......... | H04B 10/112 398/89 |
| 2009/0269073 A1* | 10/2009 | Kitaji ................. | H04B 10/1149 398/130 |
| 2010/0135668 A1* | 6/2010 | Amadeo ............ | H04B 10/1125 398/115 |
| 2010/0296434 A1 | 11/2010 | Amagai et al. | |
| 2013/0315604 A1* | 11/2013 | LoPresti ............ | H04B 10/1123 398/116 |
| 2014/0016941 A1 | 1/2014 | Coleman et al. | |

OTHER PUBLICATIONS

International Search Report for International Application No. PCT/US2015/020621, filed Mar. 14, 2015, International Search Report dated Jun. 8, 2015 and mailed Jun. 19, 2015 (4 pgs).

\* cited by examiner

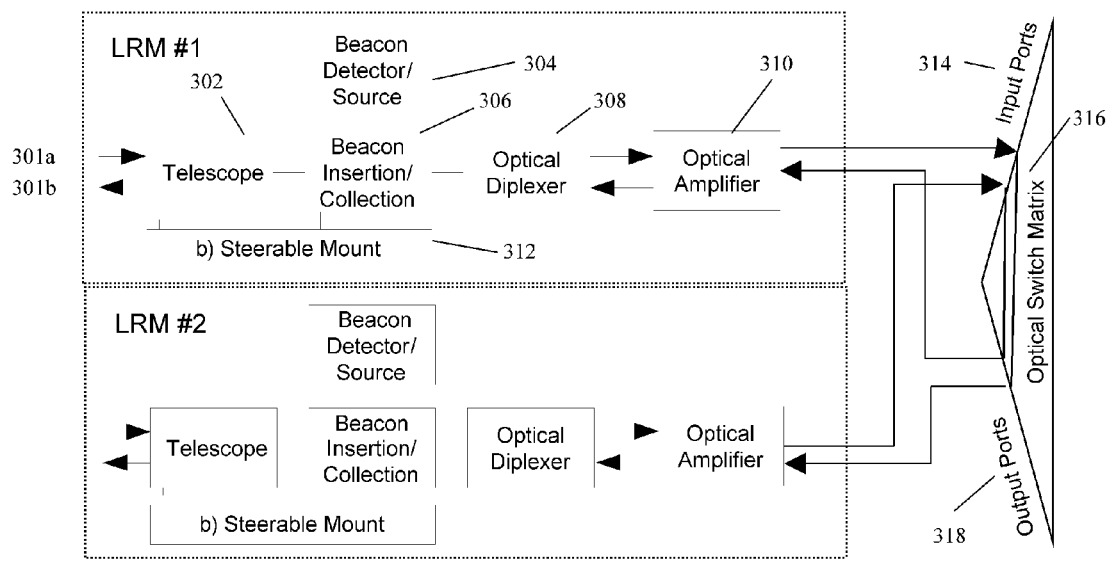
FIG. 3
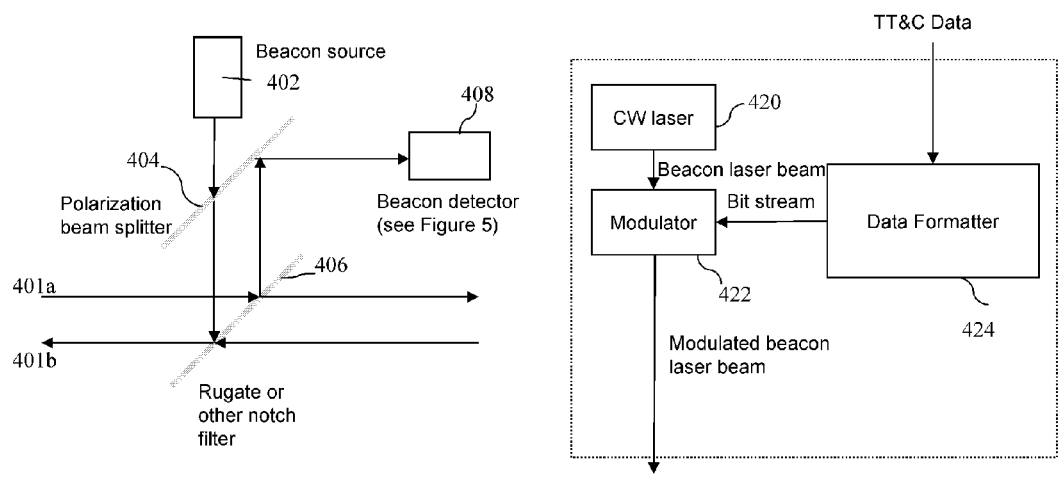
FIG. 4A   FIG. 4B

MULTI-FUNCTION BEACON FOR OPTICAL COMMUNICATIONS LASER RELAY

FIELD OF THE INVENTION

The present invention relates to free space optical communications and more specifically to a multi-function beacon signal for optical communications laser relay.

BACKGROUND

There is an increasing demand for optical networks and optical communication between nodes of such networks, because the increased global demand for high speed data exchange. Such optical communication systems need a beacon optical signal to be present to provide bi-directional line-of-sight control and accurately point to the optical receiver. A conventional optical beacon signal/beam emits a constant amount of energy over time. If the beacon beam is aligned, as desired, the same amount of energy is received at the receiving end of the beacon beam. Accordingly, these conventional optical beacon beams are not capable of carrying information, such as signal switching/routing information.

A prior attempt to build a high bandwidth space network was the Transformational Satellite Communications System (TSAT), which would have included 5 GEO satellites, with both RF and laser links, in an Internet Protocol (IP) environment. It was going to use packet switching protocol, so each packet would have contained information about the destination. However, the project was cancelled and never built. Other previous projects to build high bandwidth space communication networks planned to use dedicated static links, with reconfiguration as necessary.

However, unlike terrestrial high bandwidth communication networks, a transparent free space optical communication system does not convert from optical to electrical signals on board the spacecraft. Avoiding Optical-Electrical-Optical (O-E-O) conversion of the high bandwidth data is highly desirable, since it minimizes the complexity, size, weight, and power of the system. The optical signal is simply amplified and then switched to the appropriate path to be transmitted to the next node. The routing and scheduling information has been generated by the Network Operations Center (NOC). Because the high bandwidth signal is never converted to electrical, it is not feasible to extract header information from each data packet. The present invention describes an alternate way of distributing switching information (and other data).

SUMMARY

In some embodiments, the present invention modulates the beacon laser data stream, which is already required to maintain pointing between every pair of nodes, to carry a moderately high bandwidth signal without changing the average signal strength at lower frequency. The invention uses the beacon laser source and a beacon detector to provide a control channel for passing switching commands to an optical switch or to a next node in the network.

In some embodiments, the present invention is a method for switching optical data in a free space optical communication network including several optical nodes. The method includes: generating an optical beacon signal for aligning a communication channel of a source optical node to a communication channel of a receiving node; encoding the optical beacon signal with switching information; transmitting the modulated optical beacon signal from the source optical node to the receiving optical node; detecting the switching information from the encoded optical beacon signal, by the receiving optical node; using the encoded optical beacon signal, by the receiving optical node, to align communication channel of the receiving optical node with communication channel of the source optical node; and using the detected switching information, by the receiving optical node to change configuration of an optical switch matrix to direct data received from the source optical node to a next optical node in the free space optical communication network.

In some embodiments, the present invention is a laser relay module, for example, in a satellite or ground station, for switching optical data in a free space optical communication network, which includes several optical nodes. The laser relay module includes: a beacon source for generating an optical beacon signal for aligning a communication channel of a source optical node to a communication channel of a receiving optical node; a beacon inserter for encoding the optical beacon signal with switching information; a telescope for transmitting the encoded optical beacon signal to the receiving optical node; a beacon detector for detecting received switching information from the modulated optical beacon signal, wherein the receiving optical node uses the encoded optical beacon signal to align communication channel of the receiving optical node with communication channel of the source optical node; and a processor for using the detected switching information to change configuration of an optical switch matrix to direct received data to a next optical node in the free space optical communication network.

The switching information may further include status information, system management information, and/or telemetry information to be sent to a destination node. The encoding of the beacon with the switching information may include modulating the beacon beam with the switching information using various modulation scheme.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein:

FIG. 3 is a simplified block diagram for an exemplary laser relay module, according to some embodiments of the present invention.

FIG. 4A is a simplified block diagram of a beacon insertion/collection system, according to some embodiments of the present invention.

FIG. 4B is a simplified block diagram for an optical beacon source, according to some embodiments of the present invention.

DETAILED DESCRIPTION

Figure 1:
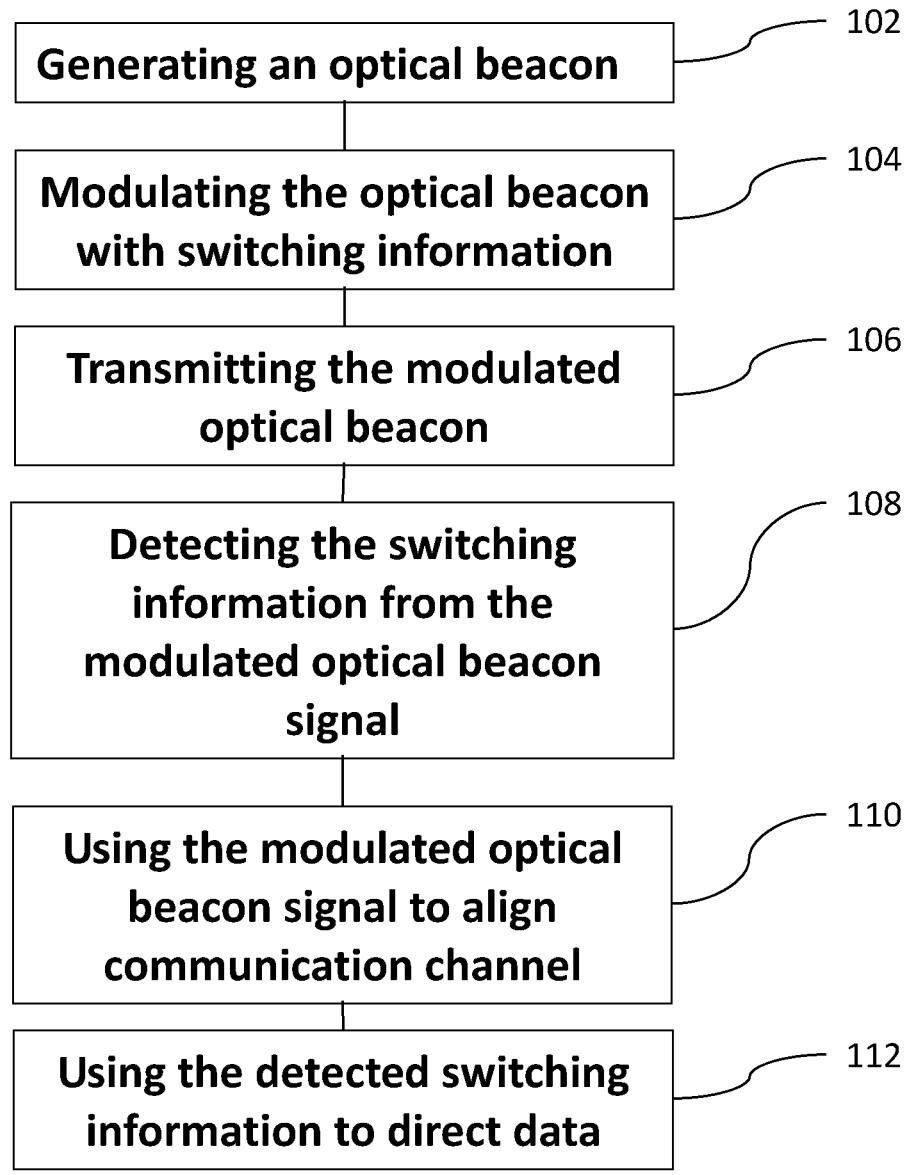
FIG. 1 shows an exemplary process flow, according to some embodiments of the present invention.

The present invention will now be described more fully with reference to the accompanying drawings, in which exemplary embodiments thereof are shown. The invention may, however, be embodied in many different forms and should not be construed as being limited to the embodiments set forth herein. Rather, these embodiments are provided so that this disclosure is thorough and complete, and will fully convey the concept of the present invention to those skilled in the art.

In some embodiments, the present invention sends time-tagged switching commands that are relayed thorough the optical network to the desired destination, by modulating the beacon signal. This way, a relatively simple electronic circuitry can extract the separate signals for LOS switching and control commands.

In some embodiments, the present invention is directed to a laser relay module (LRM) for free space optical communications. The invention modulates the optical beacon signal in a novel way to provide switching commands and telemetry information between the Network Operations Center (NOC), the satellite and ground nodes, which include one or more LRM. In some embodiments, the present invention allows the clean separation of low frequency (e.g., <1 kHz) line of sight (LOS) control signals and moderately high bandwidth (e.g., ~32 Mbps) TT&C data streams. In some embodiments, the multi-functional beacons are a common feature of all space and ground nodes in an optical network, allowing a single NOC to control the entire network in near-real-time.

In some embodiments, the present invention modulates the beacon laser beams, which need to be present to provide bi-directional line-of-sight control/pointing, as the transport medium for a moderately high bandwidth free-space laser communications network. The invention uses a beacon laser source and a beacon detector to provide a control channel for passing switching commands to an optical switch or to a next node in the network. If the next node in the network it not the final destination node, it also uses the switching commands to send the data to its next node in the network.

In some embodiments, this moderately high bandwidth would parallel the truly high bandwidth data carried by the other wavelengths/channels. Because of the reduced bandwidth of the signal carried by the beacon laser (~32 Mbps), it is possible to perform optical-to electrical-to-optical (O-E-O) conversion of the beacon signal at each node, with the packet header for each block of data used to route the information to its intended destination.

In some embodiments, the information carried by the beacon includes time-tagged and node-addressed switch configuration and other commands that allow a single NOC on the ground to control the entire satellite and ground network. For example, this information may be similar to the following:

At 2019-Dec-23, UT 13:45:00.000, Satellite 3 is commanded to point U/D-link LRM #4 at WGS coordinates 13° 45' 17.431" N, 45° 26' 0.9.131" E, altitude 253 m, establish a LOS lock, and continue to track At 2019-Dec-23, UT 13:45:00.000, Lightway 23, LGT #2 is commanded to point at a satellite with the following orbital elements, establish a LOS lock, and continue to track it {a=16,730.240 km, e=0.000000, i=0.001, . . . }

The NOC may generate a set of commands that would establish a new communication path through the network, with those commands distributed to the affected nodes so that they can all execute their respective commands simultaneously. Any hardware elements that were no longer needed to maintain a dropped communication path would be freed up as soon as the new path was established.

Moreover, the information carried by the beacon may also include time-tagged and node-labeled telemetry information flowing back to the NOC; and (moderate data rate) signals from ground or onboard sensors, such as cloud monitors, from the network nodes back to the NOC.

In some embodiments, the present invention performs full 3R (Re-amplify, Re-shape, and Re-phase) regeneration of the data after each link, so the data integrity can be maintained without requiring the signal strength to increase for packets that will have to go through multiple links to reach a final destination In some embodiments, the LRM is a self-contained device that is capable of acquiring and tracking transmission of optical signals, receiving the optical signals including the beacon signal, amplifying the optical signals, filtering and sending them to an optical router, which is controlled by the switching information, some or all of which is received via the beacon signal, and transmitting the optical signals to intended destinations, using the switching information.

FIG. 1 shows an exemplary process flow, according to some embodiments of the present invention. As shown in block 102, an optical beacon signal is generated for aligning a source laser relay module's (LRM) communication channel to a communication channel of a receiving LRM. The optical beacon signal is then modulated (or otherwise encoded) with switching information, in block 104. The switching information includes switching information for sending data to a final (LRM) destination. In some embodiments, the optical beacon signal may also be modulated to include status, system management, and/or telemetry data for other LRMs.

In block 106, the modulated optical beacon signal is transmitted from the source optical node to the receiving optical node (LRM). The switching information from the modulated optical beacon signal is detected by the receiving optical node. In some embodiments, both LOS control and communication are performed using a single detector design. For example, the beam is first detected at the higher of the two bandwidths (e.g., 32 Mbps) and then filtered or aggregated at the lower rate (e.g., 1 kHz).

The modulated optical beacon signal is then used by the receiving optical node, in block 108, to align communication channel of the receiving optical node with communication channel of the source optical node, according to known methods. Additionally, the detected switching information is used by the receiving optical node, if the switching information was intended for that node, to change the optical switch matrix configuration to direct data received from the source optical node to a next optical node in the free space optical communication network, in block 110. Switching information intended for some other node in the satellite and ground network is passed along the most direct path, using the modulated optical beacon signals along that path.

Figure 2:
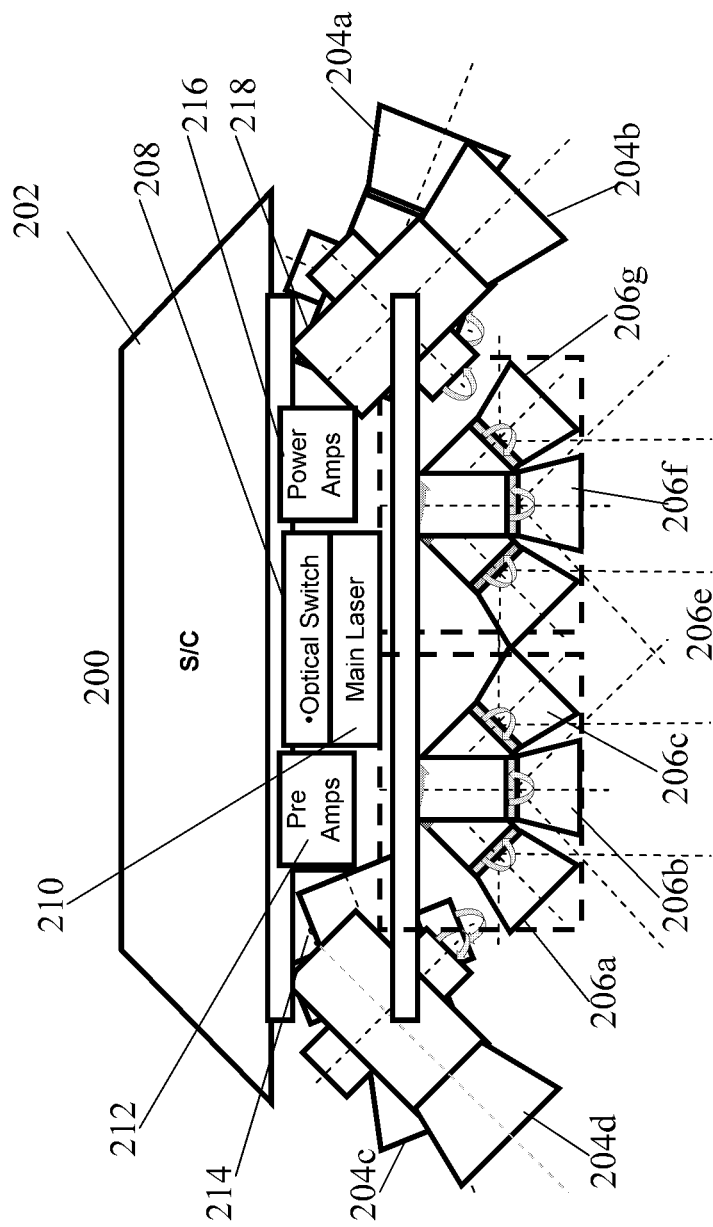
FIG. 2 is an exemplary layout view of a satellite payload including cross link and up/down telescopes, according to some embodiments of the present invention.

FIG. 2 is an exemplary layout view of a satellite payload 200, for example, in a constellation of a plurality of satellites, according to some embodiments of the present invention. As shown, a plurality of inter-satellite (cross link) telescopes 204a to 204c (four shown in this exemplary figure) are installed on an exterior portion of each satellite for inter-satellite optical communications. In this example, telescopes 204a and 204b are located at the right side of the satellite and communicate with one or more of its nearest neighbor satellites on its right side. For example, 204a would point to and communicate with the nearest neighboring satellite (i.e., adjacent satellite) on that side and 204b would point to and communicate with the next nearest neighboring satellite (i.e., two satellites away) on that side. Similarly, telescopes 204c and 204d are located at the left side and communicate with one or more of its nearest neighbor satellites on its left side. Each of the cross link telescopes is capable of being selectively steered for calibrating the optical communication with the neighboring satellites, and/or in the case of a new satellite being added to the constellation, for establishing new optical communication with the new satellite. That is, the inter-satellite optical links connect the respective satellites in a redundant network.

In some embodiments, the cross link telescopes 204a to 204d include adjustable elevation settings to track and point to (respective telescopes of) the neighboring satellites in the constellation. In some embodiments, two nearest neighbors and two next-nearest neighbors are utilized for inter-satellite communications. In some embodiments, four or more signal bundles share the same cross-link telescope.

Additionally, there are a plurality of up/down link telescopes 206a to 206g (six shown in this exemplary figure) installed on the exterior portion of each satellite for ground communication and site diversity. Another up/down link telescope either on the same satellite or a connected satellite is used for the other end of the connection. In some embodiments, Dense Wavelength Diversity Multiplexing (DWDM) is used to provide bi-directional, high bandwidth links with each ground site.

In some embodiments, the optical on-board hardware (payload) of each satellite includes a plurality of optical pre-amplifiers 212, an optical switch matrix 208, one or more main amplifiers 210, a plurality of power amplifiers 216, a Command, Control, And Telemetry (CC&T) subsystem 214, and a power supply 218. In some embodiments, the optical pre-amplifiers 212 and power amplifiers 216 support a fixed number (for example, 10) of independent channels, at each receiver.

Each of the plurality of satellites includes optical circuitry/hardware for optically processing and switching incoming and outgoing optical signals without converting the optical signals into electrical signals. The on-board hardware receives an incoming optical data stream from the ground and/or one or more neighboring satellites, optically regenerates it, uses switching information derived from an optical beacon by one or more optical switches to direct the optical data stream to the desired (selected) output path, and send it toward its final destination (ground and/or one or more neighboring satellites). Regeneration of the incoming optical data stream includes re-amplification (by the optical pre-amplifiers 212, the main amplifiers 210 and the power amplifiers 216), all in optical domain. That is, the processing of the optical data stream is accomplished without ever converting to electrical signals within each satellite payload, and transparently to data modulation schemes.

Optical switch matrix 208 allows each optical input to be optically coupled to any other output channel. In some embodiments, the optical switch matrix 208 is capable of switching whatever signal it receives on each input, including entire bundles of channels, utilizing the switching information extracted from the beacon signal. Using this information extracted from the beacon signal, the on-board optical switch matrix 208 also allows establishing and updating network optical paths as the satellite constellation passes over the ground sites. Typically, the connection between a given input and output port on the optical switch matrix persists for 40 minutes or longer, so the pace at which new configuration commands are processed is fairly slow. One or more booster lasers 210 are used on each satellite as part of the amplification chain for the optical signals on each satellite.

FIG. 3 is a simplified block diagram for an exemplary laser relay module (LRM), according to some embodiments of the present invention. One or more of the exemplary laser relay module may be used as a network node in an optical communication network, for example on a satellite, airborne, ground, and/or waterborne platform. Here, for completeness, two LRMs are depicted. LRM #1 is used here as a transmitting LRM and LRM #2 is used as a receiving LRM. The two LRMs are identical in structures and therefore only LRM #1 is annotated and described in detail. As shown, an optical telescope 302 is mounted on a steerable mount 312, for example, one or more gimbals for receiving and transmitting optical beams 301a and 301b, respectively. An optical diplexer 308 separates transmitting and received optical beams and an optical amplifier 310 restores the signal level of the received optical beam to a predetermined level for a transmitting beam.

In some embodiments, the optical diplexer 308 is configured to use a combination of polarization, wavelength, and beam propagation direction to separate the transmitting and received optical beams. In some embodiments, the optical amplifier 310 includes multiple stages of optical amplification or separate optical amplifiers that are optimized for low-noise amplification and large-signal amplification.

A modulated (or encoded) beacon laser, shown in a simplified form as a beacon (laser) source 304, is used for line of sight control of a plurality of communicating remote network nodes, and for optical transmission of switching information, status, system management, and telemetry data to other network nodes and ground cites. In some embodiments, each LRM includes a beacon source on each of its transmit paths and a beacon detector on each of its receive paths. The beacon source (laser) may be modulated directly, or used as a continuous wave laser that is modulated with an external element (not shown). The beacon laser source is pointed at the location in space that the other node (LRM) will occupy after beam propagation, using a Look-Ahead mirror that uses the known distance and angular rate to determine the offset angle. In some embodiments, using modulation on a CW laser source, each beacon carries information between nodes, with commands originating at the NOC and the telemetry terminating at the NOC.

Moreover, the beacon beam detector 304 detects an incoming beacon optical beam for line of sight control of the optical telescope and receives switching information, status, system management, and telemetry data from other network nodes. The switching information is used by one or more optical switch matrices 316 to direct the optical data to its next destination. In some embodiments, the beacon beam detector 304 determines the angle of arrival of the received beacon beam using a quadrant detector, focal plane array, or optical nutation.

A beacon insertion/collection module 306 inserts an output of the modulated beacon laser into the optical telescope 302 for transmission to another network node, for example the depicted LRM #2. The beacon insertion/collection module 306 also collects the incoming beacon optical beam 301a at the optical telescope and transports the incoming beacon optical beam to the beacon detector 304. In some embodiments, the beacon insertion/collection module 306 uses a combination of free-space and fiber optical elements for inserting the transmitting optical beacon into the optical telescope and extracting the received optical beacon from the optical telescope. In some embodiments, the signal from the beacon insertion/collection module 306 is used to control a Beam Steering Mirror (BSM) that centers the received beacon beam on the insertion/collection module 306. The motion of the BSM also centers the received communications beams on the fiber or other optical element that carries the signal to the (low-noise) optical amplifier 310.

The optical switch matrix 316 has a set of input ports 314 and a similar set of output ports 318. Each LRM has its incoming laser signal connected to an input port through fiber. The optical switch matrix 316 itself internally connects a given input port to a specific output port. The switching configuration is the detailed list of which input ports are connected to which output ports. Each output port is then connected through fiber to a respective LRM (network node).

The payload also includes a beacon laser, which produces a beacon beam for line of sight control. The beacon beam is also used for optical transmission of switching information, command and control information. In some embodiments, the communications signal is created by modulating the laser beam. In some embodiments, the beacon and primary command signals are combined in a coupler, routed to a collimator that converts the beam to free space transport. A lead ahead mirror maybe used to account for the distance that the platform moves during the transmit/receive round trip. The beacon beam is aligned with the receiver beam in the optical diplexer and transmitted out to the free space by the telescope.

In some embodiments, each LRM or similar transceiver on a satellite and Laser Ground Terminal (LGT) or similar transceiver at a ground node includes both a beacon laser source and a beacon detector to maintain LOS control.

FIG. 4A is a simplified block diagram for a beacon insertion/collection system, according to some embodiments of the present invention. A Rugate or other notch filter 406 extracts the spectral bands being used by the modulated beacon, from the incoming beam from another LRM (or beacon source 402) and inserts the modulated beacon being transmitted by this LRM. In some embodiments, the transmitted and received beacons are on adjacent channels, to provide some spectral separation without complicating the design of the notch filter. A Polarization beam splitter 404 provides additional isolation between the transmit and receive beacons, with orthogonal linear polarization used for the two signals. The transmitted beacon is then received by a beacon detector 408 of the other LRM.

FIG. 4B is a simplified block diagram for an optical beacon source, according to some embodiments of the present invention. In some embodiments, each satellite node would maintain a table (not shown) showing the preferred next step in a path through the network to another satellite, to the NOC, or to a connected ground site. This table is used to determine which LRM on this satellite should forward the command. In some embodiments, the command may be sent through multiple redundant paths to ensure delivery, with the command processor at the destination checking the time tag to ensure that the command has not already been received and logged. Each new command, properly formatted and with the necessary header information, is added to the queue of command and telemetry information waiting to be sent over that link. A data formatter 424 converts these commands and telemetry (TT&C Data) to a bit stream, which would be used by a modulator 422 to modulate the output of the beacon laser 420 and generate a modulated beacon laser beam. In some implementations, there may be separate queues for commands and telemetry, with commands being given higher priority to minimize delays in transmission and telemetry being sent only when the command queue is empty.

Figure 5:
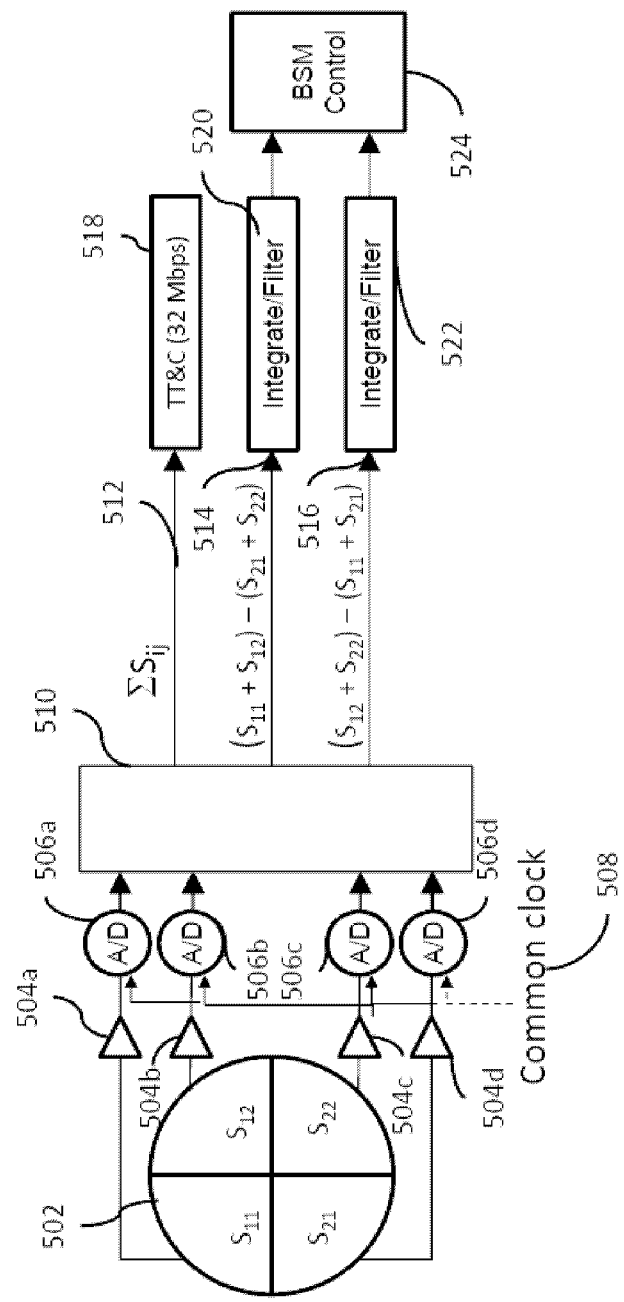
FIG. 5 is a simplified block diagram for a multi-function beacon receiver, according to some embodiments of the present invention.

FIG. 5 is a simplified block diagram for a multi-function beacon receiver, according to some embodiments of the present invention. As shown, a relatively high-speed (e.g., 2-4× the data rate) quad-cell linear photodiode 502 is used to measure the beacon signal intensity in each of four quadrants, $S_{11}$, $S_{12}$, $S_{21}$, and $S_{22}$ and produce an electrical signal for each of the four quadrants. The quad-cell linear photodiode 502 determines the relative beacon signal intensity in each quadrant. Four low-noise electrical amplifiers 504a, 504b, 504c and 504d boost the four output signals, before they are fed to respective analog-to-digital converters 506a, 506b, 506c and 506d. A moderate LNA gain and A/D dynamic range maintain adequate SNR even when atmospheric scintillation loss affects the initial signal uplink from the NOC. The outputs of the A/Ds are then fed to an arithmetic logic unit 510. The arithmetic logic unit may be a simple adder/subtractor.

The arithmetic logic unit 510 converts the (amplified) four quadrant output signals into three outputs, by performing addition and/or subtraction on the four quadrant output signals. The first output 512 of the arithmetic logic unit is a sum of all the four quadrant output signals. In some embodiments, the first output 512 (sum signal 512) carries a moderate data rate (e.g., 32-Mbps) signal, using Binary Phase Level (BPL) encoding or other modulation schemes that do not result in a weak signal when the symbol stream contains a long series of 1s or 0s. The moderate bandwidth sum signal provides a high SNR command path to the network and telemetry path back to the NOC. The sum signal 512 is then fed to an on-board computer 518 where the digital data is interpreted and appropriately utilized. The resulting data, that is, the switching information is then sent to one or more optical switches, as the control signals, to switch the data to a desired next optical node. The (e.g., 32 Mbps) data stream contains digital command words that adhere to the appropriate command dictionary that are interpreted by the on-board computer.

The second output 514 of the arithmetic logic unit is a vertical position signal, based on the difference between the two upper quadrants ($S_{11}$, $S_{12}$) and the two lower quadrants ($S_{21}$, $S_{22}$), that is:

$$(S_{11}+S_{12})-(S_{21}+S_{22}).$$

Similarly, the third output 516 of the arithmetic logic unit is a horizontal position signal, based on the difference between the two right quadrants ($S_{12}$, $S_{22}$) and the two left ones ($S_{11}$, $S_{21}$), that is:

$$(S_{12}+S_{22})-(S_{11}+S_{21}).$$

The vertical and horizontal position signals are computed at a lower rate (e.g., 1 kHz) and are then used by a BSM or gimbal controller 524 to control a BSM or gimbal that centers the received beacon beam on the detector, thereby aligning the transceiver telescopes of two communicating LRMs. The BSM movements also center the received communications beams on the fiber or other optical element that carries the signal. In some embodiments, the position signals are integrated or filtered by the filters 520 and 522 to produce a high SNR control signal suitable for BSM or gimbal control at a frequency of, for example, 1 KHz or less or more.

The network protocol (for example, Transmission Control Protocol (TCP) or User Datagram Protocol (UDP)) contains header information that are used to determine whether the current node is the final destination or whether the data packet needs to be forwarded on.

In some embodiments, checksum or other Forward Error Correction (FEC) schemes may be used to determine whether the packet has correctable errors. In some embodiments, commands to each receiving optical nodes may be checked further for formatting errors or commands that cannot possibly be executed. Commands to other nodes are directed to the proper LRM, using an on-board look up table for routing.

In some embodiments, missing commands or telemetry are identified by gaps in the sequence, and a request for retransmission is sent from the affected node back to the originator, for example, from the NOC to the satellite or Lightway for telemetry, and from the satellite or Lightway to the NOC for commands.

By having beacon sources on all transmit paths and beacon detectors on all receive paths, all communication links are maintained with good LOS control. A proper modulation scheme, for example, the Binary Phase Level modulation scheme, ensures a constant average power level, regardless of the bit stream being transmitted.

Figure 6:
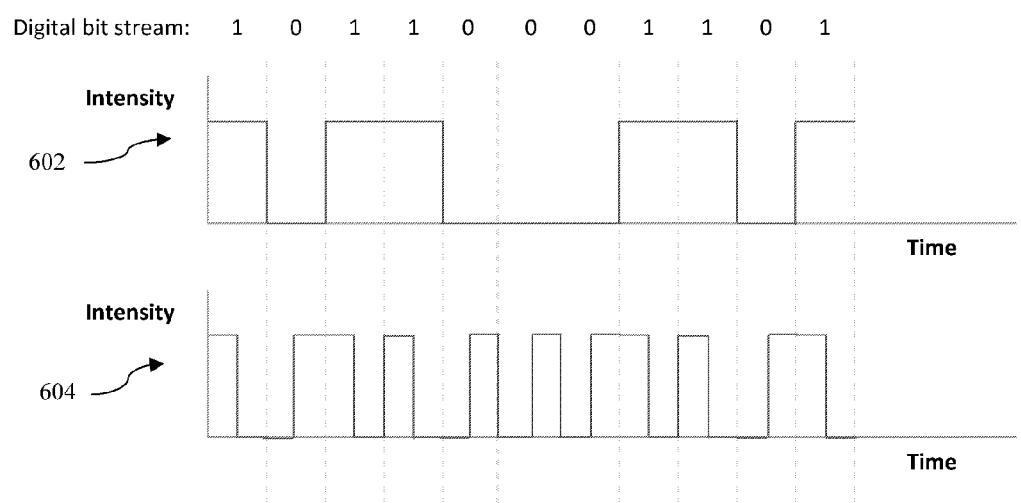
FIG. 6 illustrates two exemplary encoding schemes of an optical beacon signal, according to some embodiments of the present invention.

FIG. 6 illustrates two exemplary encoding schemes of an optical beacon signal, according to some embodiments of the present invention. The first example 602 depicts an on-off keying (OOK) encoding scheme with unipolar return to zero (RZ) encoding. On-off keying (OOK) is the simplest form of amplitude-shift keying (ASK) modulation that represents digital data as the presence or absence of a carrier wave. For example, if a carrier is present for a specific duration, it represents a binary one or zero. Likewise, the absence of the carrier for the same duration represents a binary zero or one. Some more sophisticated schemes vary these durations to convey additional information. Unipolar encoding is a line code scheme, in which a positive voltage represents a binary one, and zero voltage represents a binary zero. When extended to optical signals (vs. electrical signals), unipolar encoding uses the presence of light to represent a one and the absence of light to represent a zero. Unipolar encoding directly encodes the bitstream data, and is analogous to on-off keying in modulation. As shown by the first example 602, each bit represented by a one-bit wide pulse. This approach requires the least bandwidth for the receiver. However, the summed amplitude over time randomly varies depending on the number of 1's in the data stream, which may degrade the BSM or gimbal line-of-sight control signal.

The second example 604 illustrates a binary phase level encoding scheme. Binary phase level encoding is a digital modulation scheme that conveys data by changing, or modulating, the phase of a reference signal (the carrier wave). As shown, the summed amplitude over time is guaranteed to be constant. However, each bit, which is represented by a half-bit wide pulse, requires a higher receive bandwidth. Other encoding schemes are possible, noting that coherent modulation approaches are not considered to minimize cost.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for routing optical data in a free space optical communication network comprising a plurality of optical nodes, the method comprising:
   generating an optical beacon signal for aligning a communication channel of a source optical node to a communication channel of a receiving optical node in the free space optical communication network;
   encoding the optical beacon signal with routing information to transmit said routing information to the receiving optical node for routing a communication beam including data packets from the source optical node and received by the receiving optical node, to a next receiving optical node in the free space optical communication network, from the receiving optical node, wherein said communication beam including data packets is a different optical signal from said optical beacon beam and excludes routing information;
   transmitting the modulated optical beacon signal from the source optical node to the receiving optical node, wherein the receiving node includes a plurality of optical transceivers;
   detecting the optical routing information in the encoded optical beacon signal received by the receiving optical node, by the receiving optical node;
   using the encoded optical beacon signal, by the receiving optical node, to align communication channel of the receiving optical node with communication channel of the source optical node; and
   using the detected optical routing information, by the receiving optical node to change configuration of an optical switch matrix in the receiving optical node to redirect the communication beam received from the source optical node to a selected one of the plurality of optical transceivers in the receiving node to be transmitted to the next receiving optical node in the free space optical communication network, wherein the optical switch matrix includes a plurality of optical inputs and a plurality of optical outputs and capable of optically coupling each optical input to any of the optical outputs, wherein the communication beam remains in an optical domain within the receiving optical node.

2. The method of claim 1, wherein encoding the optical beacon signal with routing information comprises modulating the optical beacon signal with the routing information using an on-off keying (OOK) encoding scheme with unipolar return to zero (RZ) encoding.

3. The method of claim 1, wherein encoding the optical beacon signal with routing information comprises modulating the optical beacon signal with the routing information using a binary phase level encoding scheme.

4. The method of claim 1, further comprising outputting the detected routing information to the next receiving node, by the receiving optical node, along a most direct optical path, using a second modulated optical beacon signal along said most direct optical path.

5. The method of claim 1, further comprising reconfiguring the free space optical communication network, using the detected routing information.

6. The method of claim 1, wherein using the encoded optical beacon signal to align communication channel comprises determining an angle of arrival of the received encoded optical beacon signal using a quadrant detector, focal plane array, or optical nutation.

7. The method of claim 1, wherein using the encoded optical beacon signal to align communication channel comprises using the encoded optical beacon signal to control the optical switch matrix.

8. The method of claim 1, further comprising identifying missing routing information by gaps in a sequence of the received encoded optical beacon signal from an originating node, and sending a request for retransmission from the receiving optical node back to the originating node.

9. The method of claim 1, further comprising a table of preferred next path to a respective optical node in each of the optical node; and transmitting optical data to said respective optical node using the respective optical node in the table.

10. The method of claim 1, wherein encoding the optical beacon signal with routing information comprises converting the routing information to a bit stream; and using the bit stream to modulate the optical beacon signal with the routing information.

11. A laser relay module for routing optical data in a free space optical communication network comprising a plurality of optical nodes comprising:
a beacon source for generating an optical beacon signal for aligning a communication channel of a source optical node to a communication channel of a receiving optical node in the free space optical communication network;
a beacon inserter for encoding the optical beacon signal with routing information for routing a communication beam including data packets from the source optical node and received by the receiving optical node to a next receiving optical node, from the receiving optical node, wherein said communication beam including data packets is a different optical signal from said optical beacon beam and excludes routing information;
a telescope for transmitting the encoded optical beacon signal to the receiving optical node, wherein the receiving node includes a plurality of optical transceivers;
a beacon detector in the receiving optical node for detecting received optical routing information in the modulated optical beacon signal, wherein the receiving optical node uses the encoded optical beacon signal to align communication channel of the receiving optical node with communication channel of the source optical node;
an optical switch matrix including a plurality of optical inputs and a plurality of optical outputs and capable of optically coupling each optical input to any of the optical outputs; and
a processor for using the detected routing information to change configuration of an optical switch matrix in the receiving optical node to redirect the communication beam to a selected one of the plurality of optical transceivers in the receiving node to be transmitted to the next receiving node in the free space optical communication network, wherein the communication beam remains in an optical domain within the receiving optical node.

12. The laser relay module of claim 11, wherein the beacon inserter is configured to modulate the optical beacon signal with routing information using an on-off keying (OOK) encoding scheme with unipolar return to zero (RZ) encoding, or a binary phase level encoding scheme.

13. The laser relay module of claim 11, further comprising a table for storing preferred next path to a respective optical node for transmitting optical data to said respective optical node.

14. The laser relay module of claim 11, wherein the optical switch matrix is controlled using the encoded optical beacon signal to align said communication channels.

15. The laser relay module of claim 11, further comprising a data formatter for converting the routing information to a bit stream, wherein the beacon inserter utilizes the bit stream to modulate the optical beacon signal with the routing information.

16. A satellite including one or more of the laser relay modules according to claim 11.

\* \* \* \* \*